(12) United States Patent
Zhang

(10) Patent No.: US 12,346,186 B2
(45) Date of Patent: Jul. 1, 2025

(54) VOLTAGE ADJUSTMENT METHOD AND APPARATUS, COMPUTER DEVICE AND READABLE MEDIUM

(71) Applicant: ZTE CORPORATION, Guangdong (CN)

(72) Inventor: Jianchang Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 3 days.

(21) Appl. No.: 18/286,394

(22) PCT Filed: Mar. 24, 2022

(86) PCT No.: PCT/CN2022/082754
§ 371 (c)(1),
(2) Date: Oct. 11, 2023

(87) PCT Pub. No.: WO2022/218121
PCT Pub. Date: Oct. 20, 2022

(65) Prior Publication Data
US 2024/0201769 A1    Jun. 20, 2024

(30) Foreign Application Priority Data

Apr. 15, 2021   (CN) .......................... 202110405696.6

(51) Int. Cl.
*G06F 1/00*     (2006.01)
*G06F 1/30*     (2006.01)
*G06F 11/30*    (2006.01)

(52) U.S. Cl.
CPC .................................. *G06F 1/305* (2013.01)

(58) Field of Classification Search
CPC .......... G06F 1/305; G06F 1/28; G06F 1/3206; G06F 1/3287; G06F 1/3296; Y02D 10/00; G05F 1/56
See application file for complete search history.

(56) References Cited

U.S. PATENT DOCUMENTS 9,529,404 B2 * 12/2016 Noro .......................... G06F 1/32
2009/0049314 A1 * 2/2009 Taha ..................... G06F 1/3296
713/300

(Continued)

FOREIGN PATENT DOCUMENTS

CN       103425223  A    12/2013
CN       105677000  A     6/2016
(Continued)

OTHER PUBLICATIONS

WIPO, International Search Report issued on May 31, 2022.
(Continued)

*Primary Examiner* — Xuxing Chen
(74) *Attorney, Agent, or Firm* — Li & Cai Intellectual Property (USA) Office

(57) ABSTRACT

Provided are a voltage adjustment method, a voltage adjustment apparatus, a computer device, and a readable medium. The voltage adjustment method includes: detecting (S11) an index parameter, and calculating (S12) a first dispersion parameter of the index parameter according to detection values of the index parameter within preset duration; and in response to the first dispersion parameter being greater than a preset first threshold, adjusting (S13) a voltage of a processor core corresponding to the index parameter.

14 Claims, 3 Drawing Sheets

--- determine a voltage adjustment value and an adjustment direction of the processor core corresponding to the index parameter according to the average of the index parameter and a preset second threshold — S131 in response to a case where the sum of the voltage adjustment value and a current voltage of the processor core corresponding to the index parameter is less than a preset third threshold, adjust the voltage of the processor core corresponding to the index parameter according to the adjustment direction and a preset step value — S132

(56) References Cited

U.S. PATENT DOCUMENTS

| | | | |
|---|---|---|---|
| 2009/0235268 A1* | 9/2009 | Seidman | G06F 11/3466 |
| | | | 718/104 |
| 2010/0164286 A1 | 7/2010 | Okano | |
| 2013/0311799 A1 | 11/2013 | Fitzpatrick et al. | |
| 2014/0111030 A1 | 4/2014 | Chou et al. | |
| 2014/0149769 A1 | 5/2014 | Brock et al. | |
| 2017/0357310 A1 | 12/2017 | Hovis et al. | |
| 2018/0181170 A1* | 6/2018 | Gomi | G06F 1/3287 |
| 2020/0287459 A1 | 9/2020 | Schmitz et al. | |

FOREIGN PATENT DOCUMENTS

| | | |
|---|---|---|
| CN | 111654186 A | 9/2020 |
| CN | 112292652 A | 1/2021 |
| JP | 2011151309 A | 8/2011 |
| JP | 2016181168 A | 10/2016 |
| JP | 2019146416 A | 8/2019 |
| WO | WO 20080114416 A1 | 9/2008 |
| WO | WO 20160205225 A1 | 12/2016 |

OTHER PUBLICATIONS

Japan Patent Office, first Office action dated Sep. 10, 2024, for corresponding JP application No. 2023-550131.
European Patent Office, the Extended European Search Report dated Aug. 20, 2024, for corresponding EP application No. 22787350.2.

* cited by examiner

VOLTAGE ADJUSTMENT METHOD AND APPARATUS, COMPUTER DEVICE AND READABLE MEDIUM

CROSS-REFERENCE TO RELATED APPLICATIONS

The present application is a National Phase Application filed under 35 U.S.C. 371 as a national stage of PCT/CN2022/082754, filed on Mar. 24, 2022, an application claiming the priority to Chinese Patent Application No. 202110405696.6 filed with the CNIPA on Apr. 15, 2021, the entire contents of which are incorporated herein by reference.

TECHNICAL FIELD

The present disclosure relates to, but is not limited to, the field of automatic control technology.

BACKGROUND

With the improvement of living conditions and the development of the Internet of Everything technology, the Internet of Things has been increasingly applied to various industries such as the application of phone watches for kids and the application of pet trackers, so that people can track and position kids and pets anytime and anywhere. If voltages of the trackers are unstable, the problems such as unstable network signals, crashes of the trackers, and repeated restarts of the trackers may be caused, which will result in loss of connection of the kids or the pets.

At present, in order to solve the problem of the unstable voltages of the trackers, a general solution is to adjust an overall voltage by means of hardware; and there are some solutions which adopt power amplifiers to adjust the overall voltage. Nowadays, the solutions of adjusting the overall voltage are widely applied to communication modules and trackers.

SUMMARY

Embodiments of the present disclosure provide a voltage adjustment method, a voltage adjustment apparatus, a computer device, and a readable medium.

In a first aspect, an embodiment of the present disclosure provides a voltage adjustment method, including: detecting an index parameter; calculating a first dispersion parameter of the index parameter according to detection values of the index parameter within a preset duration; and in response to the first dispersion parameter being greater than a preset first threshold, adjusting a voltage of a processor core corresponding to the index parameter.

In another aspect, an embodiment of the present disclosure further provides a voltage adjustment apparatus, including a detection module, a processing module, and a core voltage adjustment module. The detection module is configured to detect an index parameter; the processing module is configured to calculate a first dispersion parameter of the index parameter according to detection values of the index parameter within a preset duration, and instruct, in response to the first dispersion parameter being greater than a preset first threshold, the core voltage adjustment module to adjust a voltage of a processor core corresponding to the index parameter; and the core voltage adjustment module is configured to adjust the voltage of the processor core corresponding to the index parameter.

In still another aspect, an embodiment of the present disclosure further provides a computer device, including: one or more processors; and a storage device having one or more programs stored thereon. When the one or more programs are executed by the one or more processors, the one or more processors are caused to implement the voltage adjustment method as described above.

In yet another aspect, an embodiment of the present disclosure further provides a computer-readable medium having a computer program stored thereon, wherein, when executed by a processor, the computer program implements the voltage adjustment method as described above.

DETAIL DESCRIPTION OF EMBODIMENTS

Figure 1:
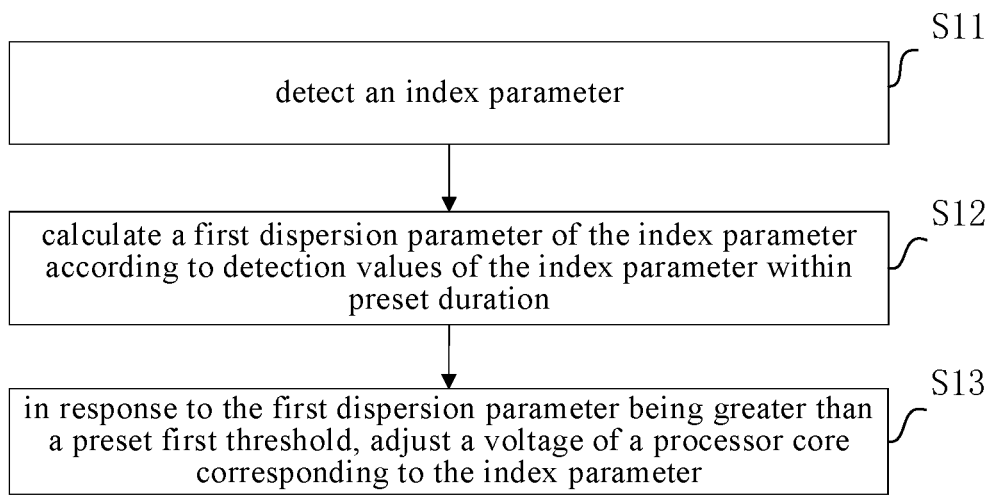
FIG. 1 is a flowchart illustrating a voltage adjustment method according to an embodiment of the present disclosure.

Exemplary embodiments will be described more fully below with reference to the drawings, but the exemplary embodiments may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The term "and/or" as used herein includes any and all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The embodiments described herein can be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

An embodiment of the present disclosure provides a voltage adjustment method for adjusting a voltage of a terminal device, which may be a positioning terminal device, a tracking terminal device (e.g., a phone watch), or a UFI (mobile hotspot) terminal device, and especially a terminal device with a battery. In the embodiments of the present disclosure, the terminal device is formed by a multi-core system, that is, the terminal device includes a plurality of processor cores, different processor cores perform different functions and have different service ranges, and a voltage of each processor core can be adjusted independently.

As shown in FIG. 1, the voltage adjustment method includes the following operations S11 to S13.

In operation S11, an index parameter is detected.

The index parameter is configured to determine whether to perform voltage adjustment on the terminal device, and index parameters for the different processor cores of the terminal device are different. In this operation, the index parameter of each processor core is detected according to a preset period.

In operation S12, a first dispersion parameter of the index parameter is calculated according to detection values of the index parameter within a preset duration.

In this operation, a plurality of detection values (e.g., all the detection values) of the index parameter, which are detected within a period of time (i.e., the preset duration) before a current moment, are acquired, and the first dispersion parameter is calculated according to the detection values of the index parameter. The preset duration before the current moment is a time period from a moment ahead of the current moment by the preset duration to the current moment. For example, if the preset duration is 10 seconds and the current moment is 9:01:10, the detection values of the index parameter within the time period of 9:01:00-9:01:10 are acquired in this operation.

The first dispersion parameter can reflect a variation condition of the index parameter. The greater the first dispersion parameter is, the larger the variation range of the index parameter is. The less the first dispersion parameter is, the smaller the variation range of the index parameter is.

In operation S13, in response to the first dispersion parameter being greater than a preset first threshold, a voltage of a processor core corresponding to the index parameter is adjusted.

In this operation, if it is determined that the first dispersion parameter is greater than the first threshold, which indicates that the variation range of the index parameter is relatively large, the voltage of the corresponding processor core is adjusted to improve performance and stability of the terminal device.

In this operation, related read-write actions on the voltage of the corresponding processor core include resource application, resource binding, resource release, and other operations. After the adjustment of the voltage of the processor core is completed, an adjustment complete status needs to be informed, so that the voltage of the processor core can be set for normal operation.

The voltage adjustment method provided by the embodiment of the present disclosure includes: detecting the index parameter, and calculating the first dispersion parameter of the index parameter according to the detection values of the index parameter within the preset duration; and in response to the first dispersion parameter being greater than the preset first threshold, adjusting the voltage of the processor core corresponding to the index parameter. According to the method provided by the embodiment of the present disclosure, the core voltage of the corresponding processor core is adjusted in a case where the index parameter changes greatly. Compared with the solutions of adjusting the overall voltage, the method provided by the embodiment of the present disclosure obviates the need for addition of extra hardware devices, does not increase electricity consumption of the terminal device, does not cause communication interruption of services in the voltage adjustment process, and can solve the problems of a failure to report a location and a restart of the terminal device caused by unstable voltages, improve performance, stability and robustness of the terminal device, reduce power consumption, and prolong service life of the terminal device.

It should be noted that a default initial value of a voltage of each processor core is adopted in the system when the terminal device is started for the first time. Just after a detection module detects the index parameters, the respective voltages of the processor cores are adjusted according to variations of the index parameters with the method provided by the embodiment of the present disclosure, so that an input overall voltage of the terminal device is changed. Adopting the solution according to the embodiment of the present disclosure can provide good inherit capability and compatibility of new and old products for users.

In some embodiments, after the voltage of the processor core corresponding to the index parameter is adjusted (i.e., the operation S13), the method may further include: detecting the index parameter, and calculating a second dispersion parameter of the index parameter according to detection values of the index parameter within a preset duration; and in response to the second dispersion parameter being greater than the first threshold, adjusting the voltage of the processor core corresponding to the index parameter. That is, after the adjustment of the voltage of the corresponding processor core is completed, the index parameter is detected again, and whether to further perform adjustment on the voltage of the processor core is determined based on the detection values of the index parameter, so that a voltage adjustment feedback mechanism of the processor core is established, dynamic adjustment of the voltage of the processor core is realized, and accuracy and timeliness of the voltage adjustment are ensured.

In some embodiments, the index parameter may include an operating parameter and/or a network parameter, a voltage of a processor core corresponding to the operating parameter is a voltage of an Application Processor (AP) core, and a voltage of a processor core corresponding to the network parameter is a voltage of a Modem (Modulator-Demodulator) core. After an adjustment of the voltage of the AP core is completed, the AP core can communicate with the Modem core at a current voltage of the AP core. When a change of the operating parameter is detected, the voltage of the AP core is gradually adjusted. After an adjustment of the voltage of the Modem core is completed, the Modem core can perform network data transmission with a base station network at a current voltage of the Modem core. When a change of the network parameter is detected, the voltage of the Modem core is gradually adjusted. It should be noted that, in the embodiments of present disclosure, the adjustment of the voltage of the Modem core and the adjustment of the voltage of the AP core are independent of each other, and may be performed separately or simultaneously.

In some embodiments, the operating parameter may include a memory usage parameter and/or a Central Processing Unit (CPU) usage parameter, such as memory usage and CPU occupancy; and the network parameter may include network transmission data size and/or signal strength. The network transmission data size and the signal strength are mainly in the charge of the Modem core, and the memory usage parameter and the CPU usage parameter are mainly in the charge of the AP core.

The detection module detects the operating parameter and/or the network parameter, and sends the detected operating parameter and/or the detected network parameter to a processing module. If the processing module determines that the memory usage parameter and/or the CPU usage parameter have/has a relatively large variation range, the processing module instructs a core voltage adjustment module to adjust the voltage of the AP core according to a current memory usage parameter and/or a current CPU usage parameter. By adjusting the voltage of the AP core to solve the problems of memory usage and CPU occupation, the memory and/or the CPU are/is prevented from being in a full-load operation state or an idle state for a long time, so that the voltage of the AP core is optimized; and if the processing module determines that the network transmission data size and/or the signal strength have/has a relatively large variation range, the processing module instructs the core voltage adjustment module to adjust the voltage of the Modem core according to the network transmission data size and/or the signal strength, so that the voltage of the Modem core is optimized to meet a current demand of a user.

In the existing technology, a general solution is to adjust an overall voltage of the terminal device to realize reduction of an overall power consumption of an electronic device. According to an existing technique, the overall voltage is adjusted according to a load state: load state information of a load module is acquired, and a voltage adjustment signal is obtained according to the load state information and a pre-stored logic mapping lookup table; and an input voltage at an input terminal of the load module is adjusted according to the voltage adjustment signal. Such solution introduces a mechanism of the logical mapping lookup table to enable automatic adjustment of the input voltage of the load module in the presence of a change of the load state, so that energy conservation of the electronic device is realized, which achieves a purpose of low power consumption.

According to another existing technique, power consumption of a communication device is reduced based on a situation of Wireless Fidelity (Wi-Fi) communication. When the communication device turns on a Wi-Fi mode, a wireless communication module included in the communication device identifies whether service data to be sent exists currently; if the service data to be sent exists currently, the wireless communication module acquires receiving attribute information; according to the receiving attribute information, the wireless communication module determines a sending rate of the service data; and according to the sending rate, the wireless communication module determines a supply voltage value of a power amplifier connected to the wireless communication module, so that the power amplifier can amplify, at the supply voltage value, a service request signal carrying the service data.

The current solutions to reduction of power consumption mainly have the following problems.

1. In a case where the terminal device (e.g., a tracker) is indoors, the terminal device can hardly receive enough network signals due to obstruction of several walls. In such case, if the network signals are unstable or the tracker cannot find a signal, a serious deviation of positioning information of a user or a failure of the user to receive a signal from the tracker may be caused, with the result that the user cannot accurately position the tracker. Just by increasing the overall voltage of the tracker, a power supply demand for the voltage of the Modem core cannot be met when the network signals are weak.

2. In the solution of reducing the power consumption of the communication device based on the situation of Wi-Fi communication, when it is found that a size of communication data of the Wi-Fi communication device is not large or there is no communication data for the Wi-Fi communication device, an overall voltage is reduced or set to 0. When the solution is applied to a mobile internet product, the problem of a shutdown or a restart of the whole product may be caused. Since both the restart of the whole product and resetting of the overall voltage may cause an increase in the power consumption, the solution is ineffective in reducing the power consumption.

3. In the solution of adjusting the overall voltage according to the load state, when the problems of high data transmission and weak signal strength of the load module are detected, the overall voltage is increased through a hardware strategy. However, the voltage of the Modem core or the voltage of the AP core cannot be improved, and the voltages of those processor cores cannot be stabilized with the increase in the overall voltage.

The embodiment of the present disclosure provides a voltage adjustment solution for improving product stability and reducing power consumption by adjusting the voltages of the multiple cores to increase or reduce the voltages of performance-related processor cores. With the solution, the problems of the failure to report a location and the restart of the terminal device caused by the unstable voltage of the terminal device can be solved well, and the voltages of the multiple cores can be dynamically adjusted to improve the stability. The solution can fill a gap in the market of multi-core voltage adjustment.

In some embodiments, the first dispersion parameter may include a variance or a standard deviation.

Figure 2:
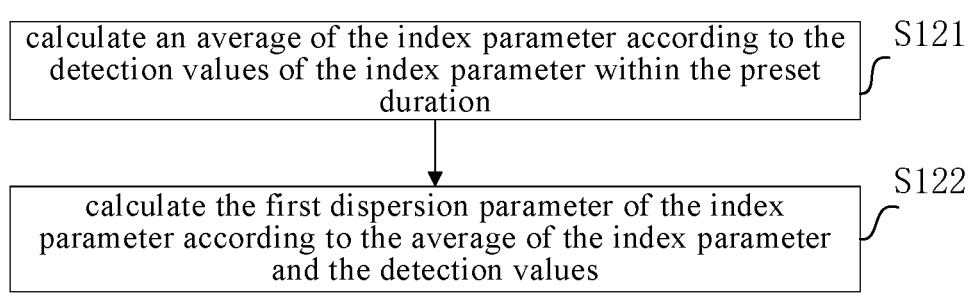
FIG. 2 is a flowchart illustrating calculation of a first dispersion parameter according to an embodiment of the present disclosure.

In some embodiments, as shown in FIG. 2, calculating the first dispersion parameter of the index parameter according to the detection values of the index parameter within the preset duration (the operation S12) may include the following operations S121 and S122.

In operation S121, an average of the index parameter is calculated according to the detection values of the index parameter within the preset duration.

In operation S122, the first dispersion parameter of the index parameter is calculated according to the average of the index parameter and the detection values.

Taking a case where the first dispersion parameter is the variance and the index parameter is the signal strength as an example, 10 pieces of signal strength data, i.e., $S_1, S_2, S_3, S_4, S_5, S_6, S_7, S_8, S_9, S_{10}$, are acquired within 2 minutes, and an average S of the signal strength is calculated by $$\bar{s} = \frac{s_1 + s_2 + s_3 + s_4 + s_5 + s_6 + s_7 + s_8 + s_9 + s_{10}}{10},$$

and a variance $w^2$ of the signal strength satisfies $$W^2 = \frac{\sum (S_i - \bar{S})^2}{10},$$

where i=(1, 2, . . . 10). Whether the signal strength is stable is determined according to the magnitude of the variance. If the variance of the signal strength is greater than the first threshold, the voltage of the Modem core is adjusted.

It should be noted that the standard deviation is an arithmetic square root of the variance, and the standard deviation can also reflect a dispersion degree of a data set. For example, according to the above example, the standard deviation of the signal strength is $$W = \sqrt{\frac{\sum (S_i - \bar{S})^2}{10}}.$$

Figure 3:
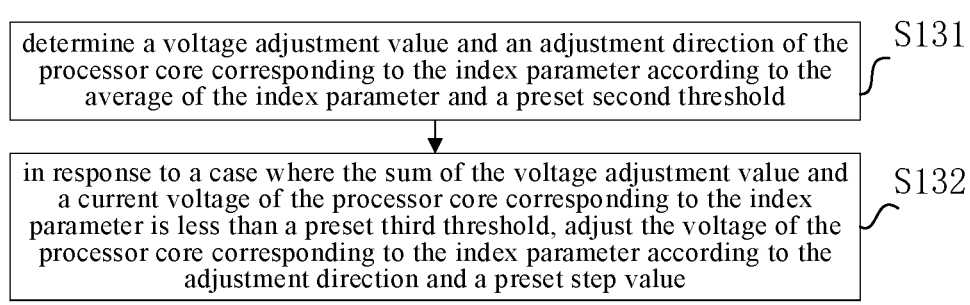
FIG. 3 is a flowchart illustrating adjustment of a voltage of a processor core according to an embodiment of the present disclosure.

In some embodiments, as shown in FIG. 3, adjusting the voltage of the processor core corresponding to the index parameter (i.e., the operation S13) may include the following operations S131 and S132.

In operation S131, a voltage adjustment value and an adjustment direction of the processor core corresponding to the index parameter are determined according to the average of the index parameter and a preset second threshold.

In this operation, a difference between the average of the index parameter and the second threshold is calculated, and an absolute value of the difference is the voltage adjustment value for the processor core to be adjusted. If the average of the index parameter is greater than the second threshold, the adjustment direction is downward adjustment (that is, adjusting downwards); and if the average of the index parameter is less than the second threshold, the adjustment direction is upward adjustment (that is, adjusting upwards).

In operation S132, in response to a case where the sum of the voltage adjustment value and a current voltage of the processor core corresponding to the index parameter is less than a preset third threshold, the voltage of the processor core corresponding to the index parameter is adjusted according to the adjustment direction and a preset step value.

The third threshold is determined according to hardware parameters of the processor core corresponding to the index parameter. In this operation, the sum of the current voltage of the processor core corresponding to the index parameter and the voltage adjustment value obtained in the operation S131 is calculated. If the sum of the current voltage of the processor core corresponding to the index parameter and the voltage adjustment value obtained in the operation S131 is less than the third threshold, which indicates that a current voltage adjustment is within an allowable range of the processor core, the voltage of the processor core corresponding to the index parameter is adjusted according to the adjustment direction and the preset step value. If the sum of the current voltage of the processor core corresponding to the index parameter and the voltage adjustment value obtained in the operation S131 is greater than or equal to the third threshold, which indicates that the current voltage adjustment exceeds the allowable range of the processor core and may cause damage to hardware, the voltage of the processor core is no longer adjusted. It should be noted that, in this operation, the voltage adjustment is performed gradually according to the step value, and the step value can be set reasonably to avoid damage to the terminal device due to an excessive adjustment to the voltage.

Figure 4:
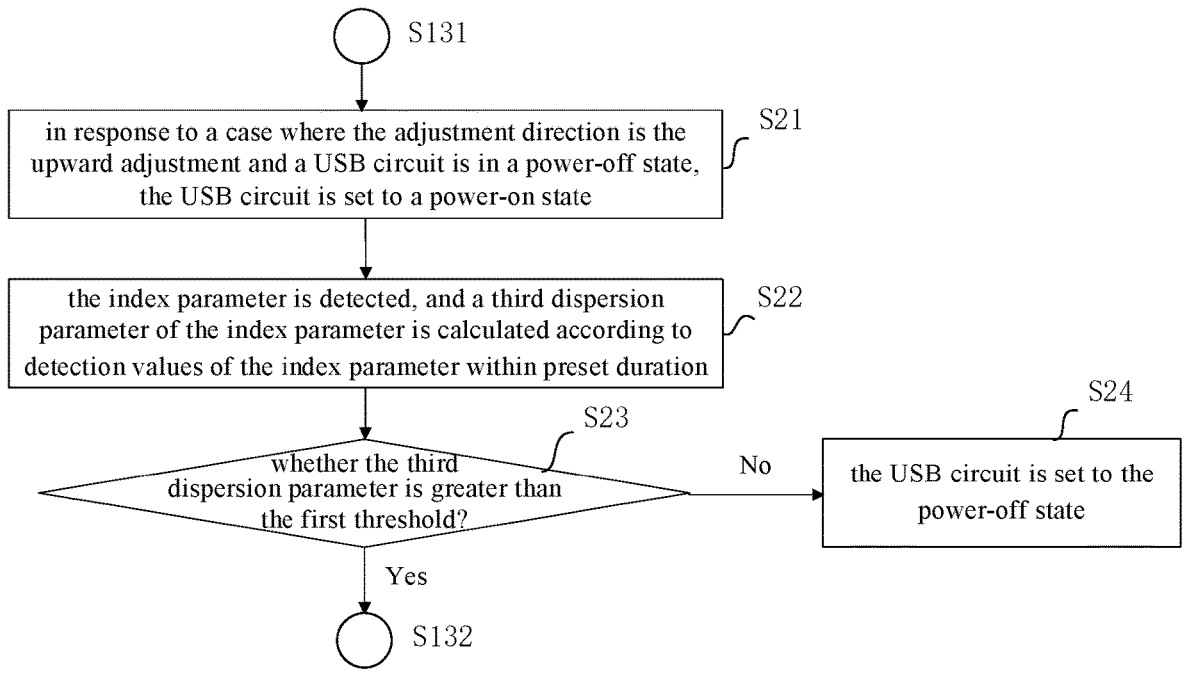
FIG. 4 is a flowchart illustrating a change of a state of a Universal Serial Bus (USB) circuit for a Modem core according to an embodiment of the present disclosure.

In view of the solution of detecting the network parameter and adjusting the voltage of the Modem core accordingly, in some embodiments, as shown in FIG. 4, after the voltage adjustment value and the adjustment direction of the processor core corresponding to the index parameter are determined according to the average of the index parameter and the preset second threshold (i.e., the operation S131), and before the voltage of the processor core corresponding to the index parameter is adjusted according to the adjustment direction and the preset step value (i.e., the operation S132), the method further includes the following operations S21 to S24.

In operation S21, in response to a case where the adjustment direction is the upward adjustment and a USB circuit is in a power-off state, the USB circuit is set to a power-on state.

In this operation, if it is determined that the voltage of the Modem core needs to be adjusted upwards and the USB circuit is currently in the power-off state, the power-on state of the USB circuit may be simulated, that is, the USB circuit may be set to the power-on state, which may be achieved by modifying a state of the USB circuit in a register. An effect of simulating the power-on state of the USB circuit is equivalent to an effect of charging the terminal device through an adapter.

In operation S22, the index parameter is detected, and a third dispersion parameter of the index parameter is calculated according to detection values of the index parameter within a preset duration.

After the power-on state of the USB circuit is simulated, detection of the index parameter (i.e., the network parameter) is continued to feed back an adjustment effect of the voltage of the Modem core, so as to determine whether to further adjust the voltage. In this operation, the third dispersion parameter may be the same as the first dispersion parameter.

In operation S23, it is determined whether the third dispersion parameter is greater than the first threshold, and if the third dispersion parameter is greater than the first threshold, the operation S132 is performed; and if the third dispersion parameter is less than or equal to the first threshold, the operation S24 is performed.

In this operation, if the third dispersion parameter is greater than the first threshold, it is indicated that the variation range of the network parameter is still relatively large, a demand of the voltage of the Modem core cannot be met merely by simulating the power-on state of the USB circuit, and the voltage of the Modem core needs to be further adjusted, so the operation S132 is performed, that is, the voltage of the Modem core is adjusted according to the adjustment direction and the preset step value in the case where the sum of the voltage adjustment value and the current voltage of the Modem core is less than the third threshold. If the third dispersion parameter is less than or equal to the first threshold, it is indicated that the variation range of the network parameter is relatively small at this time, for example, the terminal device has moved to a position with a better network situation at this time, the voltage of the Modem core does not need to be adjusted again, and the simulation of the power-on state of the USB circuit does not need to be continued, so the operation S24 is performed.

In operation S24, the USB circuit is set to the power-off state.

This operation can be implemented by modifying the state of the USB circuit in the register.

It is found by actual tests that a terminal device with a battery has a defect of relatively poor signals when registering on a network using an output voltage of the battery, and the final reason is that the voltage of the battery cannot meet power requirements of some networks. In view of this, the embodiments of the present disclosure disclose simulating the power-on state of the USB circuit to make up for this defect. In a case where the transmit power cannot meet a requirement for registration on a current network, a power-on action of the USB circuit is simulated, otherwise a power-off action is simulated. With the above actions, the terminal device can register on the network quickly, and is prevented from being restarted due to a failure of the voltage of the Modem core to meet the requirement of the current network when the terminal device registers on the network. If the voltage of the Modem core still cannot reach a voltage desired by the current network after the power-on action of the USB circuit is simulated, the voltage adjustment of the Modem core can be continued through the voltage adjustment feedback mechanism.

It should be noted that, after the voltage adjustment value and the adjustment direction of the processor core corresponding to the index parameter are determined according to the average of the index parameter and the preset second threshold (i.e., the operation S131) and before the voltage of the processor core corresponding to the index parameter is adjusted according to the adjustment direction and the preset step value (i.e., the operation S132), the method further includes: in response to a case where the adjustment direction is the downward adjustment and the USB circuit is in the power-on state, setting the USB circuit to the power-off state. That is, in a case where it is determined that the voltage of the Modem core needs to be adjusted downwards, and the USB circuit is currently in the power-on state, the power-off state of the USB circuit is simulated, that is, the USB circuit is set to the power-off state.

Figure 5:
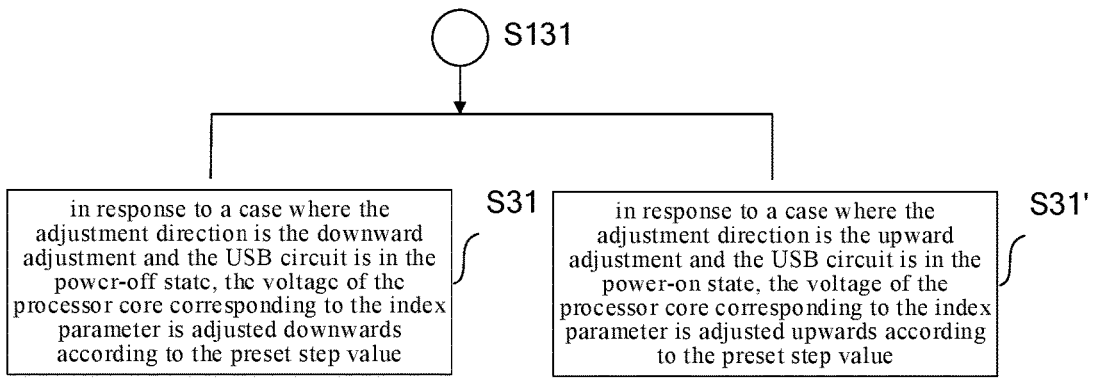
FIG. 5 is a flowchart illustrating direct adjustment of a voltage of a Modem core according to an embodiment of the present disclosure.

In some embodiments, as shown in FIG. 5, adjusting the voltage of the processor core corresponding to the index parameter according to the adjustment direction and the preset step value (i.e., the operation S132) further includes the following operations S31 and S31'.

In operation S31, in response to a case where the adjustment direction is the downward adjustment and the USB circuit is in the power-off state, the voltage of the processor core corresponding to the index parameter is adjusted downwards according to the preset step value.

In this operation, in the case where the sum of the voltage adjustment value and the current voltage of the Modem core is less than the third threshold, if the adjustment direction is the downward adjustment and the USB circuit is in the power-off state, the voltage of the Modem core can be directly adjusted downwards according to the step value without adjusting the state of the USB circuit.

In operation S31', in response to a case where the adjustment direction is the upward adjustment and the USB circuit is in the power-on state, the voltage of the processor core corresponding to the index parameter is adjusted upwards according to the preset step value.

In this operation, in the case where the sum of the voltage adjustment value and the current voltage of the Modem core is less than the third threshold, if the adjustment direction is the upward adjustment and the USB circuit is in the power-on state, the voltage of the Modem core can be directly adjusted upwards according to the step value without adjusting the state of the USB circuit.

In the embodiment of the present disclosure, after initialization of the AP core and the Modem core is completed, the terminal device performs voltage adjustment on the processor cores according to the respective indexes. The AP core and the Modem core further establish communication connection and can perform normal data interaction, and the terminal device is used under a current network condition. The terminal device monitors the index parameters (including the network parameter and/or the operating parameter) in real time. When determining that the network parameter is changed greatly, the terminal device preferably simulates the power-on state of the USB circuit, and then adjusts, in response to a case where the voltage of the Modem core still cannot meet a requirement, the voltage of the Modem core. When determining that the operating parameter is changed greatly, the terminal device directly adjusts the voltage of the AP core. After the voltage adjustments of the processor cores are completed, detection of the index parameters is continued through the feedback mechanism to realize dynamic adjustment of the voltages of the processor cores.

The embodiment of the present disclosure provides a voltage adjustment solution, which can achieve, after a low-power network tracker based on Bluetooth and Narrow Band Internet of Things (NB-IOT) cannot find a signal or is restarted abnormally, system stability by increasing or reducing the voltage of the processor core through detection of whether the voltage of the processor core meets a requirement of a current system.

Figure 6:
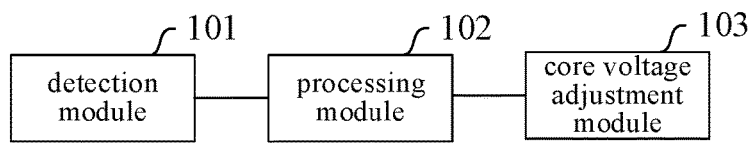
FIG. 6 is a schematic structural diagram of a voltage adjustment apparatus according to an embodiment of the present disclosure.

More and more battery-included terminal devices having a Wi-Fi component and other components are applied, and requirements of users on performance and stability of the terminal devices become higher and higher. The more the hardware components carried by a terminal device are, the higher the requirement on voltage stability of a processor core of a system is; and the more complicated the network environment of a terminal is, and the higher the requirement on voltage stability of a Modem core is. For example, more and more 5G terminals, especially outdoor Customer Premise Equipment (CPE), are applied at present. Once a voltage of a Modem core or a voltage of an AP core fails to meet a requirement of a change of a current network, a terminal device faces problems of network registration failures or repeated restarts, and the problems are tricky because most of the outdoor CPEs are located in relatively high positions or are fixed in respective positions and thus cannot be detached conveniently. Moreover, a plurality of components, such as a Global Positioning System (GPS), a Bluetooth component, and a Wi-Fi component, are integrated in one tracker, and the addition of those components results in an increase in division of the overall voltage, and the requirements on the stability of the voltage of the Modem core and the stability of the voltage of the AP core become higher. If the voltage of the Modem core and the voltage of the AP core are too high, abnormal operation or an increase in overall power consumption may be caused; and if the voltage of the Modem core and the voltage of the AP core are too low, the problems that the terminal device is restarted or cannot register on the network are caused, resulting in a failure of the user to normally position the terminal device. Although the existing solutions may reduce power consumption by increasing the overall voltage by means of hardware or software, the above problems cannot be solve merely by adjusting the overall voltage once the voltage of the Modem core or the voltage of the AP core cannot meet a requirement in a current state. However, the solution provided by the embodiment of present disclosure can improve signal registration stability and user experience of current data terminal devices Based on the same technical concept, an embodiment of the present disclosure further provides a voltage adjustment apparatus. As shown in FIG. 6, the voltage adjustment apparatus includes a detection module 101, a processing module 102, and a core voltage adjustment module 103.

The detection module 101 is configured to detect an index parameter.

The processing module 102 is configured to calculate a first dispersion parameter of the index parameter according to detection values of the index parameter within a preset duration, and instruct, in response to the first dispersion parameter being greater than a preset first threshold, the core voltage adjustment module to adjust a voltage of a processor core corresponding to the index parameter.

The core voltage adjustment module 103 is configured to adjust the voltage of the processor core corresponding to the index parameter.

In some embodiments, the detection module 101 is further configured to detect the index parameter after the core voltage adjustment module 103 adjusts the voltage of the processor core corresponding to the index parameter.

The processing module 102 is further configured to calculate a second dispersion parameter of the index parameter according to detection values of the index parameter within a preset duration.

The core voltage adjustment module 103 is further configured to adjust the voltage of the processor core corresponding to the index parameter in response to the second dispersion parameter being greater than the first threshold.

In some embodiments, the first dispersion parameter includes a variance or a standard deviation.

In some embodiments, the processing module 102 is configured to calculate an average of the index parameter according to the detection values of the index parameter within the preset duration, and calculate the first dispersion parameter of the index parameter according to the average and the detection values of the index parameter.

In some embodiments, the core voltage adjustment module 103 is configured to determine a voltage adjustment value and an adjustment direction of the processor core corresponding to the index parameter according to the average of the index parameter and a preset second threshold, and adjust, in response to a case where the sum of the voltage adjustment value and a current voltage of the processor core corresponding to the index parameter is less than a preset third threshold, the voltage of the processor core corresponding to the index parameter according to the adjustment direction and a preset step value.

Figure 7:
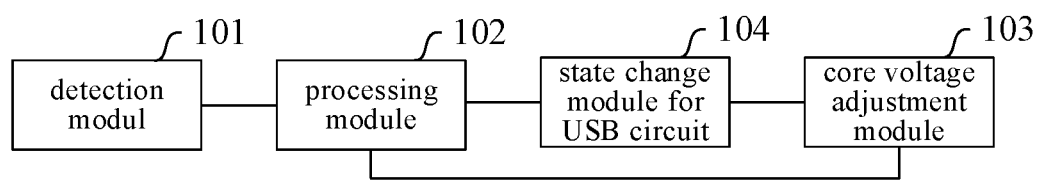
FIG. 7 is a schematic structural diagram of a voltage adjustment apparatus according to an embodiment of the present disclosure.

In some embodiments, as shown in FIG. 7, the voltage adjustment apparatus further includes a state change module for USB circuit 104, and the index parameter includes a network parameter.

The state change module for USB circuit 104 is configured to set, after the processing module 102 determines the voltage adjustment value and the adjustment direction of the processor core corresponding to the index parameter according to the average of the index parameter and the preset second threshold and before the core voltage adjustment module 103 adjusts the voltage of the processor core corresponding to the index parameter according to the adjustment direction and the preset step value, a USB circuit to a power-on state in response to a case where the adjustment direction is upward adjustment and the USB circuit is in a power-off state, set the USB circuit to the power-off state in response to a case where the adjustment direction is downward adjustment and the USB circuit is in the power-on state, detect the index parameter, and calculate a third dispersion parameter of the index parameter according to detection values of the index parameter within a preset duration.

The core voltage adjustment module 103 is configured to adjust, in response to the third dispersion parameter being greater than the first threshold, the voltage of the processor core corresponding to the index parameter according to the adjustment direction and the preset step value.

In some embodiments, the state change module for USB circuit 104 is further configured to set, after the USB circuit is set to the power-on state and the third dispersion parameter of the index parameter is calculated according to the detection values of the index parameter within the preset duration, the USB circuit to the power-off state in response to the third dispersion parameter being less than or equal to the first threshold.

In some embodiments, the index parameter includes the network parameter, and the core voltage adjustment module 103 is further configured to adjust, in response to a case where the adjustment direction is the downward adjustment and the USB circuit is in the power-off state, the voltage of the processor core corresponding to the index parameter downwards according to the preset step value, and adjust, in response to a case where the adjustment direction is the upward adjustment and the USB circuit is in the power-on state, the voltage of the processor core corresponding to the index parameter upwards according to the preset step value.

In some embodiments, the index parameter includes an operating parameter and/or a network parameter, a voltage of a processor core corresponding to the operating parameter is a voltage of an Application Processor core, and a voltage of a processor core corresponding to the network parameter is a voltage of a Modem core.

In some embodiments, the operating parameter includes a memory usage parameter and/or a CPU usage parameter, and the network parameter includes network transmission data size and/or signal strength.

An embodiment of the present disclosure further provides a computer device, including: one or more processors and a storage device having one or more programs stored thereon. When the one or more programs are executed by the one or more processors, the one or more processors are caused to implement the voltage adjustment method provided in each of the above embodiments.

An embodiment of the present disclosure further provides a computer-readable medium having a computer program stored thereon. When executed by a processor, the computer program implements the voltage adjustment method provided in each of the above embodiments.

It should be understood by those of ordinary skill in the art that the functional modules/units in all or some of the operations and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims

What is claimed is:

1. A voltage adjustment method, comprising:
   detecting an index parameter;
   calculating a first dispersion parameter of the index parameter according to detection values of the index parameter within preset duration; and
   in response to the first dispersion parameter being greater than a preset first threshold, adjusting a voltage of a processor core corresponding to the index parameter,
   wherein the first dispersion parameter comprises a variance or a standard deviation;
   wherein calculating the first dispersion parameter of the index parameter according to the detection values of the index parameter within the preset duration comprises: calculating an average of the index parameter according to the detection values of the index parameter within the preset duration; and calculating the first dispersion parameter of the index parameter according to the average and the detection values of the index parameter; and
   wherein adjusting the voltage of the processor core corresponding to the index parameter comprises:
   determining a voltage adjustment value and an adjustment direction of the processor core corresponding to the index parameter according to the average of the index parameter and a preset second threshold; and
   in response to a case where a sum of the voltage adjustment value and a current voltage of the processor core corresponding to the index parameter being less than a preset third threshold, adjusting the voltage of the processor core corresponding to the index parameter according to the adjustment direction and a preset step value.

2. The method of claim 1, after adjusting the voltage of the processor core corresponding to the index parameter, further comprising:
   detecting the index parameter, and calculating a second dispersion parameter of the index parameter according to detection values of the index parameter within preset duration; and
   in response to the second dispersion parameter being greater than the first threshold, adjusting the voltage of the processor core corresponding to the index parameter.

3. The method of claim 2, wherein the index parameter comprises an operating parameter and/or a network parameter, a voltage of a processor core corresponding to the operating parameter is a voltage of an Application Processor core, and a voltage of a processor core corresponding to the network parameter is a voltage of a Modem core.

4. The method of claim 1, wherein the index parameter comprises a network parameter, and after determining the voltage adjustment value and the adjustment direction of the processor core corresponding to the index parameter according to the average of the index parameter and the preset second threshold, and before adjusting the voltage of the processor core corresponding to the index parameter according to the adjustment direction and the preset step value, the method further comprises:
   in response to a case where the adjustment direction is upward adjustment and a Universal Serial Bus (USB) circuit is in a power-off state, setting the USB circuit to a power-on state; in response to a case where the adjustment direction is downward adjustment and the USB circuit is in the power-on state, setting the USB circuit to the power-off state; and
   detecting the index parameter, and calculating a third dispersion parameter of the index parameter according to detection values of the index parameter within preset duration; and
   adjusting the voltage of the processor core corresponding to the index parameter according to the adjustment direction and the preset step value comprises:
   in response to the third dispersion parameter being greater than the first threshold, adjusting the voltage of the processor core corresponding to the index parameter according to the adjustment direction and the preset step value.

5. The method of claim 4, after setting the USB circuit to the power-on state and calculating the third dispersion parameter of the index parameter according to the detection values of the index parameter within the preset duration, further comprising:
   in response to the third dispersion parameter being less than or equal to the first threshold, setting the USB circuit to the power-off state.

6. The method of claim 4, wherein the USB circuit is set to the power-on state or the power-off state by modifying a state of the USB circuit in a register.

7. The method of claim 1, wherein the index parameter comprises a network parameter, and adjusting the voltage of the processor core corresponding to the index parameter according to the adjustment direction and the preset step value further comprises:
- in response to a case where the adjustment direction is downward adjustment and a Universal Serial Bus (USB) circuit is in a power-off state, adjusting the voltage of the processor core corresponding to the index parameter downwards according to the preset step value; and
- in response to a case where the adjustment direction is upward adjustment and the USB circuit is in a power-on state, adjusting the voltage of the processor core corresponding to the index parameter upwards according to the preset step value.

8. The method of claim 1, wherein the index parameter comprises an operating parameter and/or a network parameter, a voltage of a processor core corresponding to the operating parameter is a voltage of an Application Processor core, and a voltage of a processor core corresponding to the network parameter is a voltage of a Modem core.

9. The method of claim 8, wherein the operating parameter comprises a memory usage parameter and/or a Central Processing Unit (CPU) usage parameter, and the network parameter comprises network transmission data size and/or signal strength.

10. The method of claim 1, wherein the index parameter is configured to determine whether to perform voltage adjustment on a terminal device, and index parameters for different processor cores of the terminal device are different.

11. The method of claim 10, wherein the detecting the index parameter comprises detecting an index parameter of each processor core according to a preset period.

12. A computer device, comprising:
- one or more processors; and
- a storage device having one or more programs stored thereon;
- wherein, when the one or more programs are executed by the one or more processors, the one or more processors are caused to implement the voltage adjustment method of claim 1.

13. A computer-readable medium having a computer program stored thereon, wherein, when executed by a processor, the computer program implements the voltage adjustment method of claim 1.

14. A voltage adjustment apparatus, comprising a detection circuit, a processing circuit, and a core voltage adjustment circuit,
- wherein the detection circuit is configured to detect an index parameter;
- the processing circuit is configured to calculate a first dispersion parameter of the index parameter according to detection values of the index parameter within preset duration, and instruct, in response to the first dispersion parameter being greater than a preset first threshold, the core voltage adjustment circuit to adjust a voltage of a processor core corresponding to the index parameter; and
- the core voltage adjustment circuit is configured to adjust the voltage of the processor core corresponding to the index parameter,
- wherein the first dispersion parameter comprises a variance or a standard deviation;
- wherein the processing circuit is configured to: calculate an average of the index parameter according to the detection values of the index parameter within the preset duration; and calculate the first dispersion parameter of the index parameter according to the average and the detection values of the index parameter; and
- wherein the core voltage adjustment circuit is configured to:
- determine a voltage adjustment value and an adjustment direction of the processor core corresponding to the index parameter according to the average of the index parameter and a preset second threshold; and
- in response to a case where a sum of the voltage adjustment value and a current voltage of the processor core corresponding to the index parameter being less than a preset third threshold, adjust the voltage of the processor core corresponding to the index parameter according to the adjustment direction and a preset step value.

* * * * *